Dec. 23, 1930.  E. R. BRADLEY  1,786,226
QUACK GRASS DIGGER
Filed April 4, 1929  2 Sheets-Sheet 1
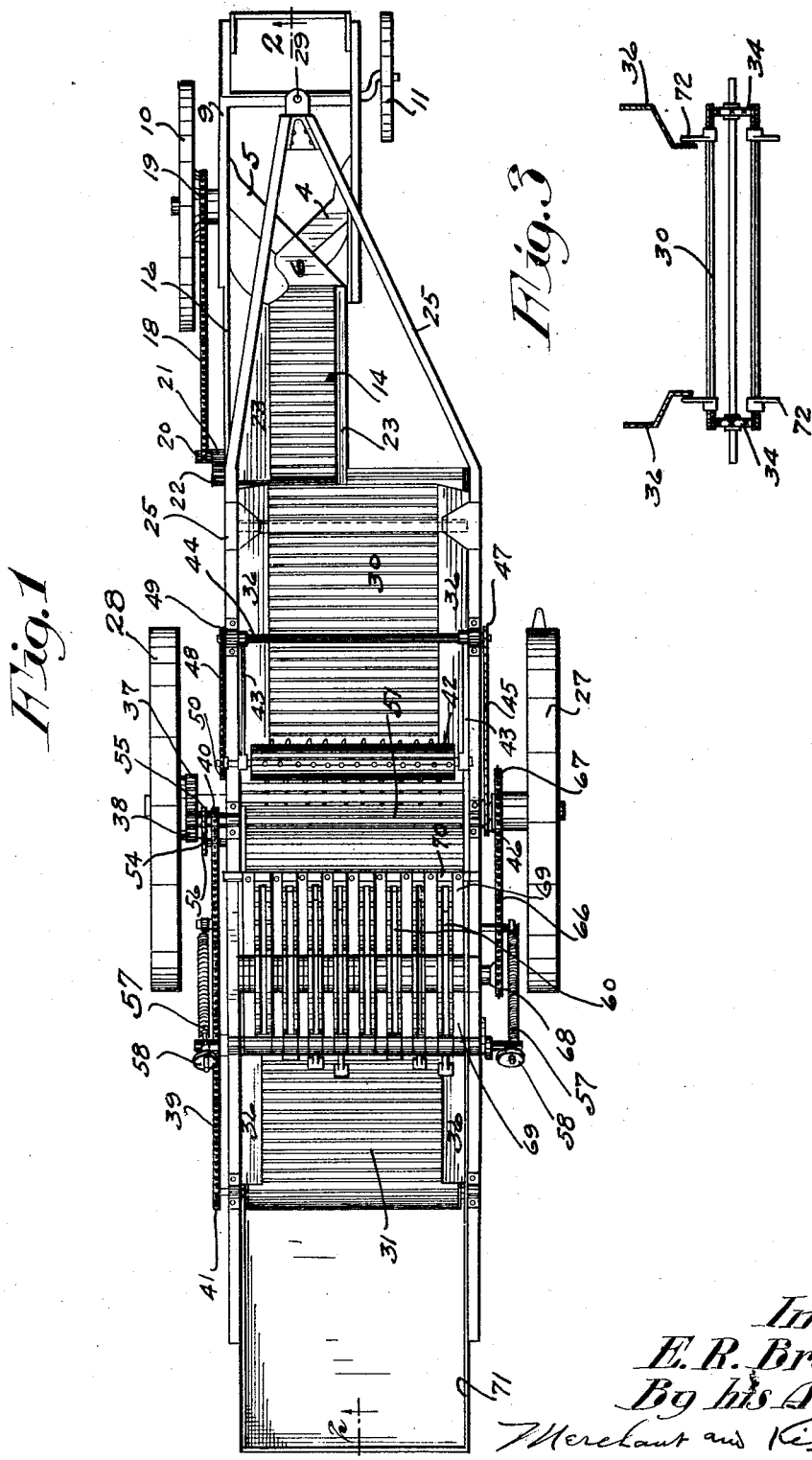

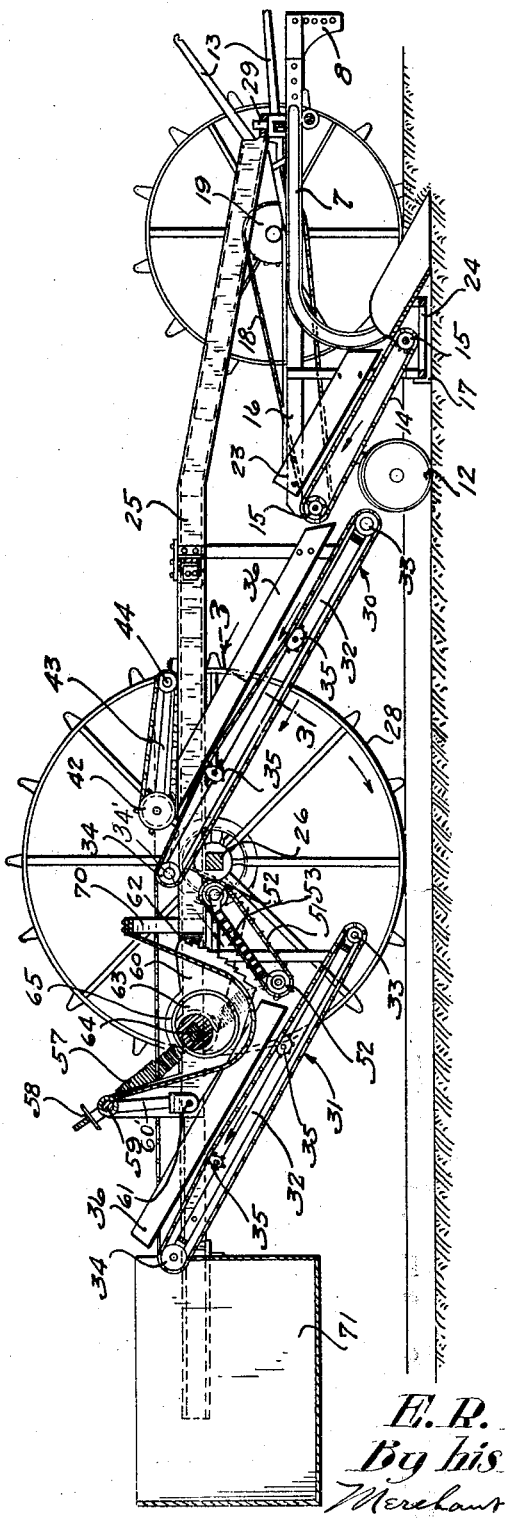

Patented Dec. 23, 1930

1,786,226

UNITED STATES PATENT OFFICE

EDGAR R. BRADLEY, OF FARGO, NORTH DAKOTA

QUACK-GRASS DIGGER

Application filed April 4, 1929. Serial No. 352,447.

My invention has for its object to provide a highly efficient quack grass digger which also serves as a tiller and aerator and, to such ends it consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the quack grass digger;

Fig. 2 is a view partly in side elevation and partly in longitudinal central section taken on the line 2—2 of Fig. 1; and Fig. 3 is a detail view in section taken substantially on the line 3—3 of Fig. 2, on an enlarged scale.

The numerals 4 and 5 indicate respectively, right and left hand plows laterally spaced to form two furrows and turn the earth therefrom between the plows and onto an apron 6 between the mold boards thereof. It is important to note that the line of draft is toward the left or land side of the machine from the longitudinal center thereof and that the left hand or land side plow 5 is considerably wider than the right hand plow, for instance, the left hand plow may be fourteen inches wide and the right hand plow ten inches wide. The purpose of making the plows 4 and 5 in different widths is to offset side draft. The beams 7 of the plows 4 and 5 have a clevis 8 and are mounted on a frame 9 which is supported on a large driving land wheel 10 and front and rear wheels 11 and 12, respectively. A pair of operating levers 13 are provided for raising the plows 4 and 5 and for setting the same for cutting furrows of different depths. All of the parts thus far described, with the exception of the plows 4 and 5 and the apron 6, are of standard and well known construction.

The earth that is turned from the furrows by the plows 4 and 5 moves upward over the mold boards and apron 6, under the advance movement of the machine onto a slat and belt conveyor 14. It may be here stated that the machine may be drawn by a tractor or in any other suitable manner. The belts of the elevator 14 are in the form of sprocket chains arranged to run over pairs of sprocket wheels 15 on upper and lower shafts, the former of which is journaled in bearings on an extension 16 of the plow frame 9 and the latter of which are journaled on rear extensions 17 on the land sides of the plows 4 and 5. The elevator 14 is driven in the direction of the arrow marked on Fig. 2 and at the proper speed by a sprocket chain 18 which runs over a relatively large sprocket wheel 19 on the hub of the land wheel 10 and a relatively small sprocket wheel 20 rigidly secured to a spur pinion 21, loosely journaled on the left side of the frame extension 16, and which pinion meshes with a spur gear 22 on the shaft of the upper sprockets 15. Side members or guards 23 are attached to the frame extension 16 at the longitudinal edges of the elevator 14 to keep the earth and quack grass thereon and to prevent the same from working therefrom into the furrows formed by the plows 4 and 5 and thus to keep the same clean.

A large amount of the loose earth turned up by the plows 4 and 5 and delivered to the elevator 14 will be precipitated through the open slats thereof and onto the ground at the back of said plows. To prevent the receiving end of the elevator 14 from being damaged or broken by stones, stumps or the like over which the plows 4 and 5 pass, there is mounted on the plow extensions 17 a strong horizontal grate 24 that underlies the receiving end of the elevator 14.

All materials that pass over the delivery end of the elevator 14 are subjected to conveying mechanism that agitates and pulverizes to break up the earth which is precipitated therefrom to separate the quack grass therefrom and collect the same. This mechanism is carried on a two-wheel truck which includes a frame 25 intermediately mounted on a fixed axle 26 on which is loosely journaled a pair of large driving wheels 27 and 28. The arrangement of the frame 25 on the axle 26 is such as to hold the load substantially balanced and the front end of the frame 25 is attached to the plow frame 9 by means of a king bolt 29 which permits angular steering movement of the plows 4 and 5 in respect to the truck.

Front and rear conveyors 30 and 31, respectively, which also serve as elevators and agitators, are mounted on supplemental frames 32 which is turn are mounted on the main frame 25. Each conveyor 30 and 31 is of a slat and belt type and runs over idle lower sprocket wheels 33 and driven upper sprocket wheels 34; the shafts of said sprocket wheels 33 and 34 are journaled on the supplemental frames 32 and the shaft of the front pair of sprocket wheels 34 is designated by the character 34'. The upper sections of the conveyors 30 and 31 are agitated to produce a shaking action by means of front and rear eccentrics 35 in the form of oval-shaped sprocket wheels over which the sprocket chains of the conveyors 30 and 31 run. It will be noted that the front pairs of agitators 35 are set 180° in advance of the rear pairs thereof so as to alternately raise and lower the respective sections of said conveyors. These conveyors 30 and 31 are upwardly and rearwardly inclined to serve as elevators and have substantially the same inclination as the elevator 14 but, of course, may be varied, at will. Side members or guards 36 are secured to the main frame 9 and the supplemental frames 32 at the longitudinal edges of the conveyors 30 and 31 to prevent the materials moving thereon from being discharged therefrom.

The front conveyor 30 is driven from the wheel 28 in the direction of the arrow marked thereon in Fig. 2 by means of a relatively large spur gear 37, on the inner end of the hub of said wheel, which meshes with a spur pinion 38 on the shaft 34'. The conveyor 31 is driven in the same direction as the conveyor 30 by a sprocket chain 39 which runs over a sprocket wheel 40 on the shaft 34' and a sprocket wheel 41 on the shaft of the rear pair of sprocket wheels 34.

Cooperating with the conveyor 30 is a retarding device which, as shown, is in the form of a toothed cylinder 42 that extends transversely over said conveyor near the delivery end thereof. The shaft of this retarding cylinder 42 is journaled in the free ends of a pair of rearwardly projecting arms 43 loosely pivoted on a shaft 44, journaled in bearings on the frame 25, for vertical swinging movement. The materials delivered onto the conveyor 30 from the elevator 14 are carried upward thereon and pass under the retarding cylinder 42 which is driven counter-clockwise in respect to Fig. 2 so that the opposing faces of said conveyor and cylinder move in reverse directions, by a sprocket chain 45 which runs over a sprocket wheel 46 on the right hand end of the shaft 34' and a sprocket wheel 47 on the shaft 44 and a second sprocket chain 48 which runs over a sprocket wheel 49 on the left hand end of the shaft 44 and a sprocket wheel 50 on the shaft of the retarding cylinder 42. The retarding cylinder 42 is gravity held on the materials as they are carried upward on the conveyor 30 and the teeth in said cylinder break up the earth and separate the quack grass therefrom with a tearing action. During the upward movement of the materials on the conveyor 30, the loose earth commingled with the quack grass is precipitated through said conveyor under the shaking action thereof by the eccentrics 35 and the earth separated from the quack grass by the retarding cylinder 42 is also precipitated through said conveyor.

As the retarding cylinder 42 is gravity held, the same will lift to permit stones, sticks, and the like to pass thereunder without damaging the machine.

Quack grass and other materials on the conveyor 30 after being subjected to the action of the retarding device 42 are precipitated from the upper or delivery end of the conveyor 30 on to a traveling feeder 51. This feeder 51 is arranged in a rearwardly and downwardly inclined position and is in the form of a slat and belt conveyor, the receiving end of which is under the delivery end of the conveyor 30 and the delivery end thereof is closely positioned to the conveyor 31 slightly rearward of its receiving end. The belts of the feeder 51 are in the form of sprocket chains which run over upper and lower sprocket wheels 52 on shafts journaled in a grate 53 that affords a deck over which the operative or upper section of the feeder 51 travels. This grate 53, at its upper end, is pivoted to the shaft of the upper pair of sprocket wheels 52 for vertical swinging movement longitudinally of the machine.

The feeder 51 is driven from the upper shaft of the conveyor 30 in the direction of the arrow marked on Fig. 2 by a short sprocket chain 54 that runs over sprocket wheels 55 on said shaft and sprocket wheels 56 on the shaft of the upper pair of sprocket wheels 52 of the feeder 51. The lower or free end of the grate 53, and hence the feeder 51, is yieldingly held raised by a pair of long coiled springs 57 the lower ends of which are attached to the shaft of the lower pair of sprocket wheels 52 and the upper ends of which are adjustably connected, as indicated at 58, to a support 59 on the frame 25.

Cooperating with the feeder 51 are a plurality of laterally spaced forwardly extended tedder arms 60 loosely pivoted on pins 61, each of which is mounted on the frame 25 by a link 60' and the support 59. The tedder arms 60, at their free ends, are elongated in vertical planes and provided with ratchet-like teeth 62. These tedder arms 60 are operated by eccentrics 63 on a shaft 64 and work in eccentric straps 65 formed with the intermediate portions of said arms. The eccentric shaft 64 is journaled on the frame 25 and driven from the wheel 27 by a sprocket chain 66 which runs over a sprocket wheel 67 on the hub of said wheel and a sprocket wheel 68 on the shaft 64. The toothed edges of the arms 60 are eccentric to the pins 61 on which said arms are pivoted and to the feeder 51 so that they have an approaching and receding movement in respect to said feeder and thereby produce pounding or crushing actions as well as raking or clawing actions on the materials on the feeder 51. As shown, there are eight tedder arms 60 and their eccentrics are set one in advance of the other.

A stripper 69 in the form of edgewise spaced bars is provided for the tedder arms 60 and between which bars said arms work. The stripper bars 69 are substantially U-shaped with their front ends attached to a support 70 on the frame 25 and with their rear ends attached to the support 59. The curved or intermediate portions of the stripper bars 69 extend under the eccentric straps 65. The purpose of these stripper bars 69 is to remove the quack grass and trash from the tedder arms 60 as they move away from the feeder 51. Lumps and clods of earth carried by the feeder 51 are crushed by the tedder arms 60 and the quack grass separated therefrom under the raking or clawing actions of said arms. The grate 53 affords a base of resistance under the action of the tedder arms 60 on the materials carried by said feeder. In case stones, sticks or other similar materials pass between the feeder 51 and tedder arms 60 the springs 57 will yield and permit the feeder 51 to swing away from the tedder arms 60 and thereby permit the obstruction to pass therebetween without damaging the machine.

The toothed edges of the tedder arms 60 and the stripper bars 69 are in upwardly diverging relation to the feeder 51 and thereby materially assist in directing materials discharged from the conveyor 30 on to the feeder 51 and under the toothed edges of the tedder arms 60.

A certain amount of the fine materials separated from the quack grass under the action of the tedder arms 60 will escape through the grate 53 and all other materials on the feeder 51 will be discharged therefrom on to the conveyor 31 and elevated thereby. During this elevation of the materials on the conveyor 31 the same is subjected to a shaking action by the respective eccentrics 35 and thereby is made the final separation of any remaining earth in the quack grass. From the conveyor 31 the quack grass is discharged into a box-like receptacle 71 carried on the rear end of the frame 25. This receptacle 71 may be mounted on the frame 25 for dumping action to discharge the quack grass therein from time to time in piles on the field. If desired, the receptacle 71 may be dispensed with and the quack grass discharged in windrows on the field from the conveyor 31. The pile or windrows of quack grass on the field may be removed or destroyed by burning or otherwise.

To prevent the escape of quack grass on the conveyors 30 and 31 at the longitudinal edges thereof and under the guards 36 there is provided a multiplicity of fingers 72 secured to the slats of said conveyors and working close to the outer faces of said guards.

The operation of the above described machine may be briefly stated as follows:

It may be assumed that the machine is traveling say four miles an hour and that the elevator is traveling six miles an hour, thus causing the earth to spread out on said elevator and give the loose earth a chance to be precipitated through the elevator and on to the ground before the same is elevated or conveyed to any great extent. The peculiar arrangement of the plows 4 and 5 is such as to cause all of the earth turned from the two furrows thereby to pass upward onto the elevator 14 so as to not leave any quack grass in the ground.

From the elevator 14 the materials thereon are delivered onto the conveyor 30 which is relatively wide and traveling at a slower speed than said elevator, say five miles per hour. This gives the materials delivered onto the conveyor a chance to spread out on said conveyor into a relatively thin layer so that the loose earth may find its way through the slats of the conveyor 30 and be precipitated therefrom under the shaking action thereof. The materials remaining on the conveyor 30 near the top thereof pass under the retarding cylinder 42 and are subjected to a tearing action by the teeth thereof and which retarding cylinder is driven at a slower speed than that of said conveyor. This tearing action produced by the retarding cylinder 42 loosens the earth and separates the quack grass therefrom. As the retarding cylinder 42 is held for floating movement over the conveyor 30 the same will rise and fall over varying thicknesses of material on said conveyor and permit stones and other hard substances to pass thereunder without damaging the machine.

The quack grass and all other materials commingled therewith that have passed by the retarding cylinder 42 are precipitated onto the feeder 51 and subjected to the pounding and raking action of the tedder arms 60 and thereby is completed the separation of the earth from the quack grass. A certain amount of the loose earth separated from the quack grass by the tedder arms 60 will escape through the grate 53. All other materials on the feeder 51 will be discharged onto the conveyor 31 and be elevated thereby and at which time the remaining loose earth will be precipitated through said conveyor under the shaking action thereof. The quack grass together with stones and other objects remaining on the conveyor 31 will be discharged from said conveyor into the receptacle 71 and disposed of in a manner as previously stated. It may be here stated that the conveyor 31 travels at a slower speed than the conveyor 30, say about four miles an hour.

From the above description it is evident that the plows 4 and 5 produce a shovel action for directing the earth to the elevator.

It is important to note that all driving connections for the machine are covered by shields to protect the same from falling dust and dirt and prevent excessive wear.

What I claim is:

1. A machine of the class described having two laterally spaced plows having their shares and mold boards in opposing relation for turning the earth from the two furrows formed thereby between said plows for discharge rearward therefrom, the land side plow being wider than the other plow to offset side draft.

2. A machine of the class described having a plow, an elevator arranged to receive the earth from the plow, an elevating conveyor arranged to receive materials from the elevator, means for shaking the conveyor, said conveyor being of the slat and belt type to permit the earth thereon to be precipitated therethrough, operating means for the elevator and conveyor, said conveyor being of a greater width than the elevator for a finer distribution of the materials thereon and operated at a slower speed than the elevator, and a retarding device being in the form of a toothed cylinder which extends transversely over the conveyor and is mounted for yielding movements in respect thereto.

3. A machine of the class described having a plow, an elevator arranged to receive the earth from the plow, an elevating conveyor arranged to receive materials from the elevator, means for shaking the conveyor, said conveyor being of the slat and belt type to permit the earth thereon to be precipitated therethrough, a movable retarding device for the materials on the conveyor, and means for operating the retarding device.

4. A machine of the class described having a plow, an elevator arranged to receive the earth from the plow, an elevating conveyor, means for shaking the conveyor, said conveyor being of the slat and belt type to permit the earth thereon to be precipitated therethrough, a feeder arranged to receive the materials discharged from the conveyor, and means for producing a pounding and raking action on the materials on the feeder.

5. A machine of the class described having a plow, an elevator arranged to receive the earth from the plow, an elevating conveyor, means for shaking the conveyor, said conveyor being of the slat and belt type to permit the earth thereon to be precipitated therethrough, an endless traveling feeder of the slat and belt type arranged to receive materials discharged from the conveyor, a grate underlying the operative section of the feeder and affording a deck therefor, and means for producing a pounding and raking action on the materials on the feeder.

6. A machine of the class described having a plow, an elevator arranged to receive the earth from the plow, an elevating conveyor, means for shaking the conveyor, said conveyor being of the slat and belt type to permit the earth thereon to be precipitated therethrough, a feeder arranged to receive materials discharged from the conveyor, a plurality of crank-actuated tedder arms the free ends of which are vertically elongated and tooth equipped for action on the materials on the feeder, means for operating the tedder arms, and a stripper for the tedder arms.

7. A machine of the class described having a plow, an elevator arranged to receive the earth from the plow, front and rear elevating conveyors, the former of which is arranged to receive materials from the elevator, means for shaking the conveyors, and a feeder working between the two conveyors and arranged to receive materials discharged from the first conveyor and deliver the same on to the rear conveyor.

8. A machine of the class described having a plow, an elevator arranged to receive the earth from the plow, front and rear elevating conveyors, means for shaking the conveyors, a retarding device cooperating with the front conveyor, a feeder between the two conveyors and arranged to receive materials from the front conveyor and deliver the same on to the rear conveyor, means for producing a pounding and raking action on the materials on the feeder, and means for driving the elevator, conveyors and feeder.

9. A machine of the class described having a plow, an elevator arranged to receive the earth from the plow, front and rear elevating conveyors, means for shaking the conveyors, a retarding device cooperating with the front conveyor, a feeder between the two conveyors and arranged to receive materials from the front conveyor and delivering the same on to the rear conveyor, means for producing a pounding and raking action on the materials on the feeder, and means for driving the elevator, conveyors and feeder, said retarding device being in the form of a toothed cylinder, and means for driving the toothed cylinder.

10. A machine of the class described having a plow, an elevator arranged to receive the earth from the plow, front and rear elevating conveyors, means for shaking the conveyors, said conveyors being of the slat and belt type to permit the earth thereon to be precipitated therethrough, a feeder arranged to receive materials discharged from the front conveyor and deliver the same to the rear elevator, a plurality of crank-actuated tedder arms the free ends of which are vertically elongated and tooth equipped for action on the materials on the feeder, means for operating the tedder arms, said feeder being yieldingly mounted in respect to the tedder arms to permit an obstruction to pass therebetween, and means for driving the elevator, conveyors, and feeder, said front conveyor being driven at a slower speed than the elevator and in which the rear conveyor is driven at a slower speed than the front conveyor.

In testimony whereof I affix my signature.

EDGAR R. BRADLEY.